(12) United States Patent
Fantinuoli (10) Patent No.: US 12,079,588 B2
(45) Date of Patent: *Sep. 3, 2024

(54) SYSTEMS AND METHODS FOR AUTOMATIC SPEECH TRANSLATION

(71) Applicant: Kudo, Inc., New York, NY (US)

(72) Inventor: Claudio Fantinuoli, Speyer (DE)

(73) Assignee: KUDO, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,663

(22) Filed: Jun. 30, 2023

(65) Prior Publication Data

US 2024/0143947 A1  May 2, 2024

Related U.S. Application Data

(63) Continuation of application No. 17/977,555, filed on Oct. 31, 2022, now Pat. No. 11,704,507.

(51) Int. Cl.
| | |
|---|---|
| *G10L 15/22* | (2006.01) |
| *G06F 40/58* | (2020.01) |
| *G10L 13/033* | (2013.01) |
| *G10L 15/04* | (2013.01) |
| *G10L 15/26* | (2006.01) |

(52) U.S. Cl.
CPC ............ *G06F 40/58* (2020.01); *G10L 13/033* (2013.01); *G10L 15/04* (2013.01); *G10L 15/22* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 5,587,902 A | 12/1996 | Kugimiya | |
| 6,356,865 B1 | 3/2002 | Franz | |
| 6,490,548 B1 * | 12/2002 | Engel | ...................... G06F 40/58 707/999.1 |
| 8,972,268 B2 | 3/2015 | Waibel et al. | |
| 8,990,069 B1 | 3/2015 | Zens et al. | |

(Continued)

OTHER PUBLICATIONS

Non-Final Office Action on U.S. Appl. No. 17/977,555 dated Jan. 20, 2023 (16 pages).

(Continued)

*Primary Examiner* — Neeraj Sharma
(74) *Attorney, Agent, or Firm* — FOLEY & LARDNER LLP (57) ABSTRACT

A method for providing automatic interpretation may include receiving, by a processor, audible speech from a speech source, generating, by the processor, in real-time, a speech transcript by applying an automatic speech recognition model on the speech, segmenting, by the processor, the speech transcript into speech segments based on a content of the speech by applying a segmenter model on the speech transcript, compressing, by the processor, the speech segments based on the content of the speech by applying a compressor model on the speech segments, generating, by the processor, a translation of the speech by applying a machine translation model on the compressed speech segments, and generating, by the processor, audible translated speech based on the translation of the speech by applying a text to speech model on the translation of the speech.

20 Claims, 4 Drawing Sheets

(56) References Cited

U.S. PATENT DOCUMENTS

| | | |
|---|---|---|
| 10,089,305 B1 | 10/2018 | Hodge |
| 10,248,651 B1 | 4/2019 | Fuerstenau |
| 10,380,263 B2 | 8/2019 | Martinez Corria et al. |
| 10,671,251 B2* | 6/2020 | German ............... G06V 30/414 |
| 10,885,286 B2* | 1/2021 | Ray ......................... G06F 40/45 |
| 11,669,860 B2* | 6/2023 | Scott-Green ............ G10L 15/22 |
| | | 705/14.47 |
| 2005/0276570 A1 | 12/2005 | Reed et al. |
| 2009/0240487 A1 | 9/2009 | Shen et al. |
| 2010/0268527 A1 | 10/2010 | Tomeh et al. |
| 2011/0246881 A1 | 10/2011 | Kushman et al. |
| 2013/0346062 A1 | 12/2013 | Lancaster et al. |
| 2016/0078020 A1 | 3/2016 | Sumita et al. |
| 2018/0032305 A1* | 2/2018 | Cameron ................ G06F 40/30 |
| 2021/0082407 A1 | 3/2021 | Kim |
| 2022/0022447 A1 | 1/2022 | Nilsson et al. |
| 2022/0215183 A1 | 7/2022 | Freitag et al. |
| 2023/0153451 A1* | 5/2023 | Malhotra ............ G06F 21/6245 |
| | | 726/26 |
| 2023/0267285 A1* | 8/2023 | Wu ....................... G06F 40/166 |
| | | 704/2 |
| 2023/0419026 A1* | 12/2023 | Pickens ................. G06F 16/35 |

OTHER PUBLICATIONS

Notice of Allowance on U.S. Appl. No. 17/977,555 dated May 16, 2023 (14 pages).

Extended European Search Report on EPO App. 23178654.2 dated Mar. 7, 2024 (9 pages).

Zheng Renjie et al: "Fluent and Low-latency Simultaneous Speech-to-Speech Translation with Self-adaptive Training", arxiv.org, Cornell University Library, 201 Olin Library Cornell University Ithaca, NY 14853, Oct. 20, 2020 (Oct. 20, 2020), XP081790705.

* cited by examiner

SYSTEMS AND METHODS FOR AUTOMATIC SPEECH TRANSLATION

This application is a continuation application of U.S. application Ser. No. 17/977,555, filed Oct. 31, 2022, which is incorporated by reference herein for all purposes.

TECHNICAL FIELD

This application relates generally to methods and systems for generating and implementing computer modeling techniques for automatic translation of spoken speech.

BACKGROUND

Interpretation services may have the potential to revolutionize the way people around the world who do not speak a common language communicate with one another. Such service may be essential for international panels and conferences. For example, an interpretation service at the United Nations may be a part of a conference interpreting system. Its core function is to provide interpretation from and into different languages for meetings held at the United Nations. Interpretation may be necessary to the participants for proper conduct and smooth functioning of their deliberations.

A skilled interpreter may be able to simultaneously listen to speech in a source language and provide an interpretation in a target language. Simultaneous interpretation may allow individuals to communicate naturally, without needing to pause to allow the interpreter to translate. However, simultaneous interpretation is a demanding process, which generally requires two or more highly skilled interpreters working in tandem. The cost and difficulty of engaging teams of highly skilled interpreters limit the use of simultaneous interpretation, despite its advantages.

In order to rectify the above-described shortcomings, various software solutions (e.g., video conferencing applications) have attempted to use computer-implemented methods to translate received audio. However, these attempts have faced technical shortcomings, as using conventional machine translation methods require high processing power and cannot provide real-time results that are reasonably accurate.

SUMMARY

For the aforementioned reasons, there is a need for systems and methods that provide automatic simultaneous or near-simultaneous interpretation. Discussed herein are systems and methods for utilizing a cascade of machine learning models for providing interpretation. The methods and systems discussed herein may utilize a cascade of models that may transcribe audible speech in a source language to generate a transcript, segment the transcript, modify the segments to compress or simplify the segments, translate the compressed segments, and synthesize audible speech in a target language from the translated compressed segments. Generating segments of the transcript and compressing the segments has the advantage of speeding up translation and the synthesis of audible speech, reducing latency or lag between the audible speech in the source language and the audible speech in the target language. Furthermore, the cascade of models may dynamically adjust the segmentation and compression based on a current or expected latency. Reducing latency allows conversation participants to engage in natural conversation without waiting for the translation to occur.

For example, a call center may utilize one or more embodiments described herein to allow employees to communicate with callers speaking various languages. Reduced latency of translation may allow call center employees and callers to maintain a natural flow of conversation and communicate effectively to resolve callers' issues. This effective communication may improve call outcomes and reduce the time required to resolve callers' issues.

Using the methods and systems discussed herein, a processor can utilize a suite of computer models to generate real-time (or near real-time) audio translation of streaming audio. For instance, the suite of computer models can be utilized to analyze received audio in a first language (e.g., receive from a speaker or from a software solution, such as a video conferencing application), translate the received audio into a second language, generate a new audio in the second language, and transmit the translated audio (e.g., to the software solution, such as a particular participant of a video conferencing application).

Using the methods and systems discussed herein, a processor can leverage automatic speech recognition (ASR), machine translation (MT) and text-synthesis (TTS) technology and by adding additional NLP/ML processing layers (discussed herein) in order to achieve a simultaneous interpretation of audio (to additional audio) having high quality. The processor can provide simultaneous/continuous translation by adapting its speed of delivery to the original and avoiding accumulation of latency. The processor can simplify and normalize the input speech in order to avoid a direct 1-to-1 translation. The processor can improve quality of ASR and MT by injecting specific meeting information for different verticals or clients.

In one embodiment, a non-transitory, computer-readable medium may include instructions which, when executed by a processor, cause the processor to receive audible speech from a speech source, apply an automatic speech recognition model on the speech to generate, in real-time, a speech transcript, apply a segmenter model on the speech transcript to segment the speech transcript into speech segments based on a content of the speech, apply a compressor model on the speech segments to compress the speech segments based on the content of the speech, apply a machine translation model on the compressed speech segments to generate a translation of the speech, and apply a text to speech model on the translation of the speech to generate audible translated speech based on the translation of the speech.

The instructions may further cause the processor to adjust a compression level of the compressor model.

The processor may adjust the compression level based on a length of the speech transcript.

The processor may adjust the compression level based on a word/time ratio of the speech segments.

The instructions may further cause the processor to adjust a speed of the text to speech model.

The processor may adjust the speed of the text to speech model based on a latency of the audible translated speech relative to the audible speech.

The instructions may further cause the processor to provide one or more known terms to the automatic speech recognition model and the text to speech model to improve a speech transcript quality and an audible translated speech quality.

Segmenting the speech transcript into speech segments may include selecting a number of words to be included in each speech segment.

Compressing the speech segments may include reducing oralities of the speech segments.

Compressing the speech segments may include simplifying the content of the speech segments.

In another embodiment, a computer-implemented method may include while receiving, by a processor, audible speech from a speech source, generating, by the processor, in real-time, an audible translated speech based on the received audible speech by generating, by the processor, in real-time, a speech transcript by applying an automatic speech recognition model on the received speech, segmenting, by the processor, the speech transcript into speech segments based on a content of the speech by applying a segmenter model on the speech transcript, compressing, by the processor, using a compressor model, the speech segments based on the content of the speech by applying a compressor model on the speech segments, generating, by the processor, a translation of the speech by applying a machine translation model on the compressed speech segments, and generating, by the processor, the audible translated speech based on the translation of the speech by applying a text to speech model on the translation of the speech.

The instructions may further cause the processor to adjust a compression level of the compression.

The processor may adjust the compression level based on a length of the speech transcript.

The processor adjusts the compression level based on a word/time ratio of the speech segments.

The instructions may further cause the processor to adjust a speed of the generation of the audible translated speech.

The processor may adjust the speed based on a latency of the audible translated speech relative to the audible speech.

The instructions may further cause the processor to provide one or more known terms in generating the speech transcript and in generating the audible translated speech to improve a speech transcript quality and an audible translated speech quality.

Segmenting the speech transcript into speech segments may include selecting a number of words to be included in each speech segment.

Compressing the speech segments may include reducing oralities of the speech segments.

Compressing the speech segments may include simplifying the content of the speech segments.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Figure 1:
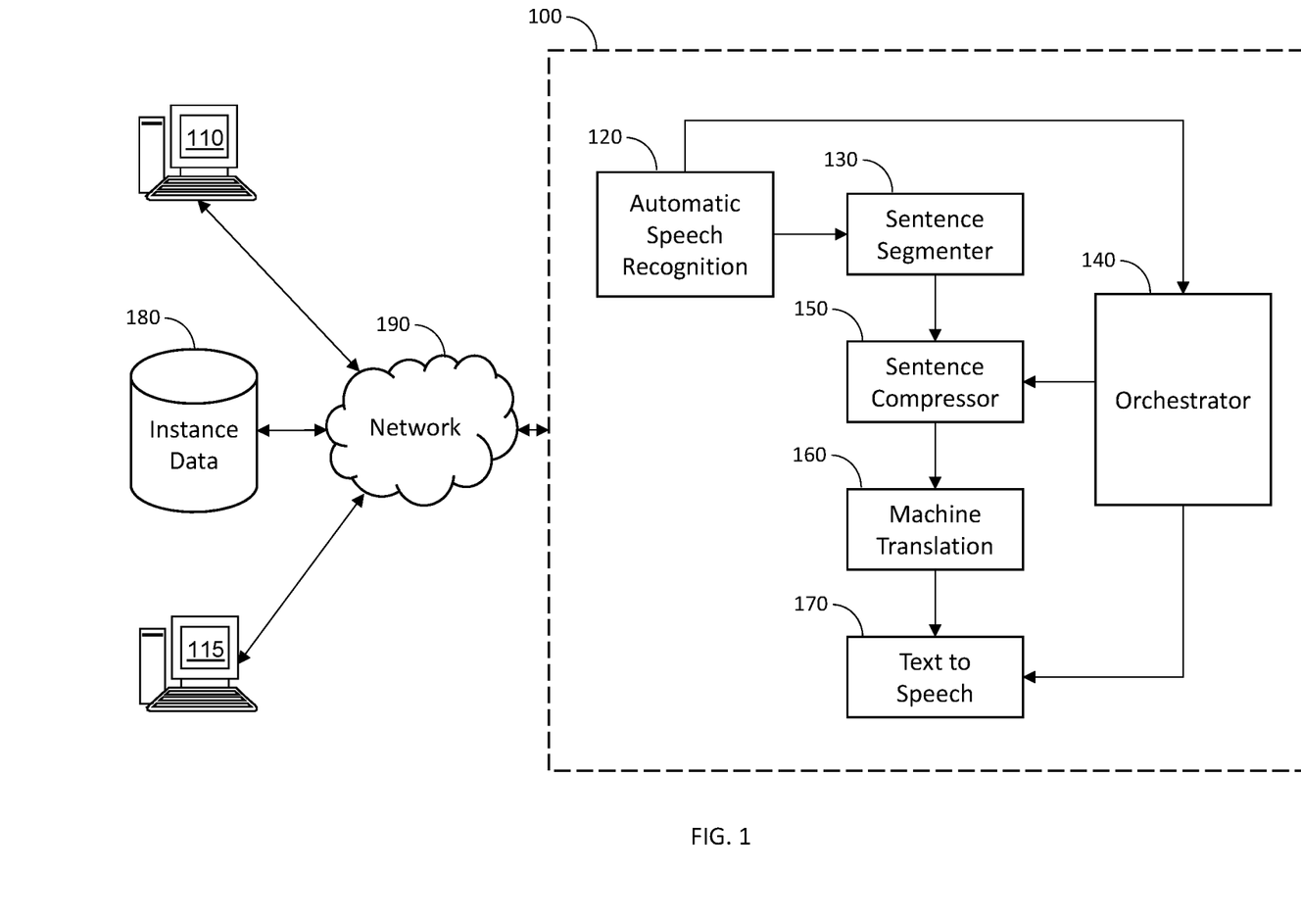
FIG. 1 illustrates a computing system for performing automatic interpretation, according to an embodiment.

FIG. 1 illustrates an example computing system 100 for performing automatic interpretation. The computing system 100 may include a processor and a memory including non-transitory, processor-readable instructions which, when executed by the processor, cause the processor to perform various operations. The memory may include an automatic speech recognition model 120, a sentence segmenter model 130, an orchestrator model, a sentence compressor model 150, a machine translation model 160, and a text to speech model 170, which may be processes or programs executed by the processor. The models may be collections of computer algorithms. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. The computing system 100 may perform the operations discussed herein by executing, by the processor, one or more programs stored in the memory.

The computing system 100 may receive audible speech from a speech source HO via a network 190, In some embodiments, the speech source 110 may be an electronic device including one or more processors and a non-transitory, processor-readable memory. In other embodiments, the speech source 110 may be an individual. For instance, the audible speech may be received via microphone in communication with the computing device 100. In another example, the audible speech may be received from another computer or a server. For instance, the audible speech may be received from a processor, computer, or server associated a video conferencing platform connecting two or more users.

The audible speech from the speech source 110 may be audible speech in a source language. The computing system 100 may deliver audible translated speech in a target language to a listener 115. In some embodiments, the listener 115 may be an electronic device including one or more processors and a non-transitory, processor-readable memory. In other embodiments, the listener may be an individual. For instance, the audible translated speech may be presented to the listener via a speaker in communication with the computing system 100. In another example, the audible translated speech may be outputted or presented by another computer or a server. For instance, the audible speech may be received from a processor, computer, or server associated with a video conferencing platform connecting two or more users.

The computing system 100 may include the automatic speech recognition model 120, the sentence segmenter model 130, the orchestrator model 140, the sentence compressor model 150, the machine translation model 160, and the text to speech model 170.

The automatic speech recognition model 120 may include an automatic speech recognition machine learning model. The automatic speech recognition model 120 may receive the audible speech from the speech source 110 and generate a speech transcript of the audible speech. The automatic speech recognition model 120 may generate the speech transcript by applying the automatic speech recognition machine learning model on the audible speech. The automatic speech recognition model 120 may generate the speech transcript in real time. In some embodiments, the automatic speech recognition model 120 is configured to generate the speech transcript from speech in the source language. In other embodiments, the automatic speech recognition model 120 is configured to detect a first language in the audible speech and generate the speech transcript by selecting a first automatic speech recognition machine learning model associated with the first language and applying the first automatic speech recognition machine learning model to the audible speech.

The sentence segmenter model 130 may receive the speech transcript from the automatic speech recognition model 120. The sentence segmenter model 130 may include a sentence segmenter machine learning model. The sentence segmenter model 130 may segment the speech transcript into speech segments based on a content of the speech. The sentence segmenter model 130 may segment the speech transcript into speech segments based on the content of the speech by applying the sentence segmenter machine learning model on the speech transcript. The speech segmenter model 130 may determine where to set segment boundaries which define the speech segments. The speech segmenter model 130 may set segment the speech transcript based on chunks of the speech transcript which are machine-translatable. In some embodiments, the speech segmenter model 130 may segment the speech transcript such that each speech segment is less than or equal to a maximum word length. The maximum word length may be selected based on a desired precision and a desired latency. Speech segments having greater length may have a greater precision of translation and a greater latency than segments having shorter length. In an example, a maximum word length of ten words may be selected for precision of translation. In another example, a maximum word length of two words may be selected for low latency. In yet another example, a maximum word length of four words may be selected for a balance between precision and low latency. In some embodiments, the sentence segmenter model 130 may add punctuation to the speech transcript. In some embodiments, the sentence segmenter model 130 may add punctuation to the speech transcript before segmenting the speech transcript. In other embodiments, the sentence segmenter model 130 may add punctuation to the speech segments after segmenting the speech transcript.

In some embodiments, the speech segmenter model 130 may apply a delay to the speech transcript. In some embodiments, the delay is a predetermined period of time. In other embodiments, the delay is a number of words. The number of words may be static or dynamic. The delay may reduce errors in segmenting the speech transcript based on the content of the speech. For example, preliminary results of the automatic speech recognition model 120 may be replaced by updated results of the automatic speech recognition model 120 based on subsequent words in the speech transcript. The delay may reduce the number of corrections to segments or segmentation the speech segmenter model 130 makes due to the updated results of the automatic speech recognition model 120.

The sentence compressor model 150 may receive the speech segments from the sentence segmenter model 130. The sentence compressor model 150 may include a sentence compressor machine learning model. The sentence compressor model 150 may compress the speech segments based on the content of the speech. The sentence compressor model 150 may compress the speech segments based on the content of the speech by applying the sentence compressor machine learning model on the speech segments. Compressing the speech segments may include removing oralities such as "um," "like," and "uh." Compressing the speech segments may include shortening and/or simplifying the speech segments. For example, a long, complex word in a speech segment may be replaced with a shorter, less complex word. In another example, a word with highly-specific meaning may be replaced with a hyperonym. In yet another example, a speech segment with complex wording may be modified to have less complex wording. In yet another example, redundancies of words or phrases may be reduced or eliminated. In some embodiments, the sentence compressor model 150 may modify the speech segments while preserving each speech segment. In other embodiments, the sentence compressor model 150 may modify first speech segments, and remove second speech segments. In yet other embodiments, the sentence compressor model 150 may combine speech segments.

The machine translation model 160 may receive the compressed speech segments from the sentence compressor model 150. The machine translation model 160 may include an machine translation machine learning model. The machine translation model 160 may generate a translation of the compressed speech segments. The machine translation model may generate the translation by applying the machine translation machine learning model on the compressed speech segments.

The text to speech model 170 may receive the translation from the machine translation model 160. The text to speech model 170 may include a text to speech machine learning model. The text to speech model 170 may generate audible translated speech based on the translation. The text to speech model 170 may generate the audible translated speech based on the translation by applying the text to speech machine learning model on the translation.

The orchestrator model 140 may receive the speech transcript from the automatic speech recognition model 120. The orchestrator model 140 may coordinate actions of the sentence compressor 150 model and the text to speech model 170 to reduce latency between the audible speech from the speech source 110 and the audible translated speech delivered to the listener 115 by the text to speech 170 model. The orchestrator may calculate a length of the speech transcript. The length of the speech transcript may include a time required to pronounce the speech transcript. The orchestrator model 140 may calculate a word/time ratio of the speech transcript. In some embodiments, the orchestrator model 140 may calculate the word/time ratio for chunks of the speech transcript. In other embodiments, the orchestrator model 140 may continuously update the word/time ratio of the speech transcript as the automatic speech recognition 120 generates, in real-time, the speech transcript. In yet other embodiments, the orchestrator model 140 may receive the speech segments from the speech segmenter model 130 and calculate a word/time ratio for each of the speech segments.

Based on the word/time ratio, the orchestrator model 140 may adjust a compression level of the sentence compressor model 150. Adjusting the compression level of the sentence compressor model 150 may include adjusting a compression level of the sentence compressor machine learning model. For example, based on the word/time ratio being above a threshold, the orchestrator model 140 may adjust a compression level of the sentence compressor model 150 upwards such that the sentence compressor model 150 applies a higher level of compression to the speech segments. Generating the compressed speech segments with the higher level of compression may result in the compressed speech segments being shorter than if a lower level of compression were applied, allowing the text to speech model 170 to play the audible translated speech to the listener 115 faster.

In some embodiments, the orchestrator model 140 may adjust a speed of the text to speech model 170 based on the word/time ratio. In other embodiments, the orchestrator model 140 may adjust the speed of the text to speech model 170 based on a latency between the audible speech from the speech source 110 and the audible translated speech delivered to the listener 115. Adjusting the speed of the text to speech model 170 may include adjusting a speed of the text to speech machine learning model. In an example, adjusting the speed of the text to speech model 170 upward may cause the text to speech model 170 to generate the audible translated speech faster and/or play the audible translated speech to the listener 115 faster. The listener 115 may perceive the faster playback of the audible translated speech as faster speech.

The computing system 100 may receive, via the network 190, instance data 180. The instance data 180 may include a list of terms specific to an instance and/or use of the computing system 100. The instance data 180 may provide the list of terms to the automatic speech recognition model 120 to improve a speech transcript quality. The instance data 180 may provide the list of terms to the machine translation model 160 to improve a translation quality. In an example, the instance is a conversation between a doctor and a patient, and the list of terms includes "arrhythmia," "congenital," "stent," and "soluble fiber." These terms may be rare enough to introduce errors into the speech transcript and the translation. Providing these terms to the automatic speech recognition model 120 and the text to speech model may reduce the errors in the speech transcript and translation. In another example, the list of terms includes names of participants in a conversation. The names may not have been included in training data for the automatic speech recognition machine learning model of the automatic speech recognition model and the machine translation machine learning model of the machine translation model 160. Providing the names to the automatic speech recognition model 120 and the machine translation model 160 may prevent the names from being transcribed and translated as similar-sounding words. In some embodiments, the instance data 180 includes a pronunciation of a term in the list of terms. The instance data 180 may provide the pronunciation to the text to speech model 170 to improve an audible translation quality.

Using the illustrated paradigm in FIG. 1, the computing system 100 (e.g., segmenter 130) may segment the continuous transcription in meaningful sentences. The inputted audio can be parsed into sentences and then segmented into a meaningful series of sentences (e.g., sentences are the shortest possible units of meaning). The system 100 may utilize short sentences in order to achieve a simultaneous-like effect.

The system 100 may coordinate the speech flow and may take continuous decisions on actions to be performed. For examples, the system 100 may determine that information needs to be segmented/parsed in order to allow simultaneity (similar to a human interpreter); a sentence needs to be reformulated in order to make the concept more clear; if the voice needs to speed up in order to stay as near as possible to the speaker. The system 100 can also select the gender of the voice and/or identify the style of the voice (neutral, happy, etc.), as needed.

Figure 2:
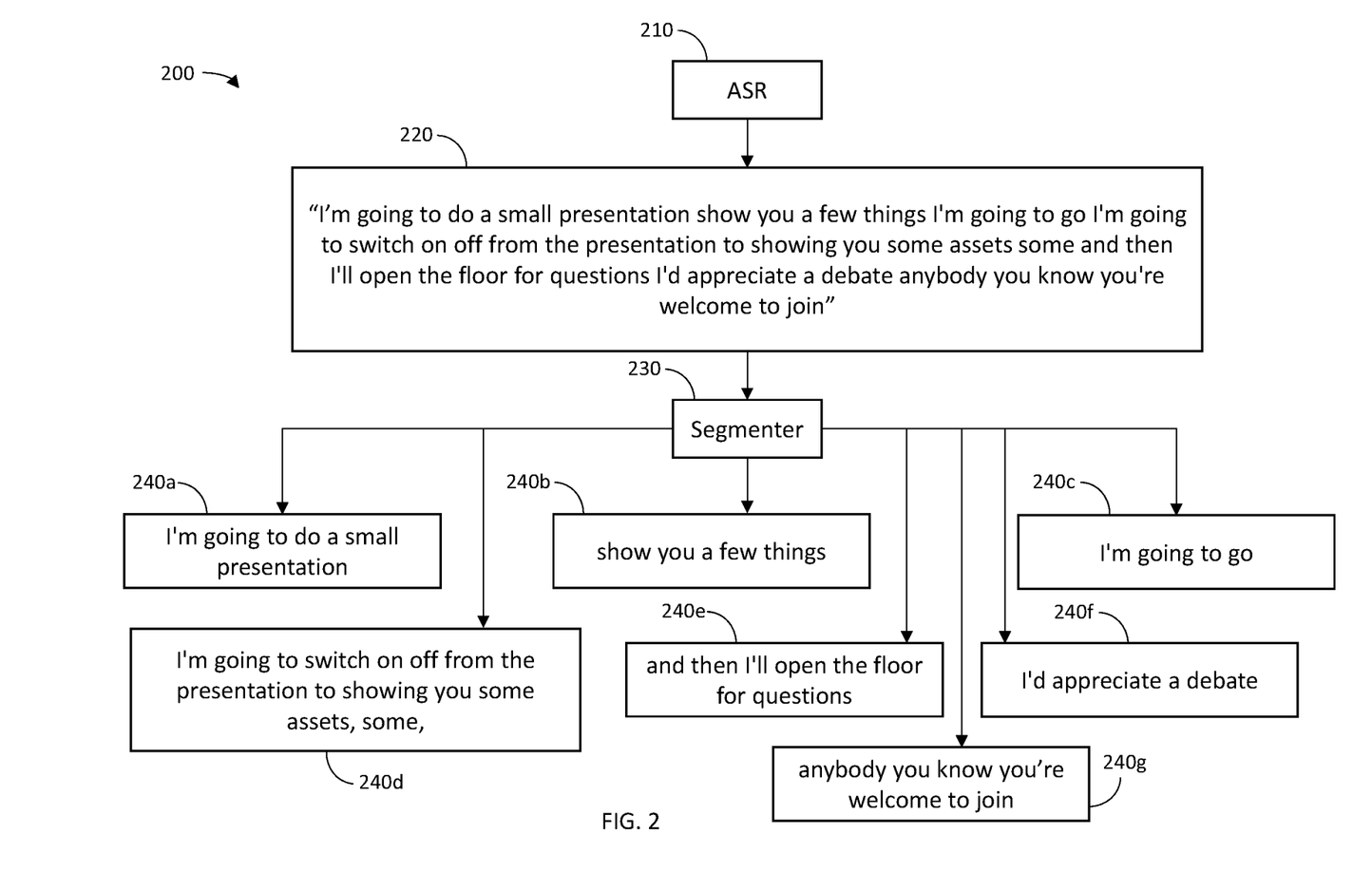
FIG. 2 illustrates a block diagram of speech segments generated from an example speech transcript, according to an embodiment.

The system 100 (e.g., orchestrator or segmenter) may performs transformation on the text depending on the context and the settings. For instance, certain sentences may be shortened or reformulated for more clarity. That is, the system 100 may transform the often-confused way people speak (for example unclear structured sentences) into a translated audio that is better structured and suitable for machine translation FIG. 2 illustrates an example block diagram 200 of speech segments 240 generated from an example speech transcript 220. An automatic speech recognition model 210 may provide the speech transcript 220 to a sentence segmenter model 230 which may generate the speech segments 240 based on the speech transcript 220. The automatic speech recognition model 210 and the sentence segmenter model 230 may be the automatic speech recognition model 120 and the sentence segmenter model 130 of FIG. 1. The sentence segmenter model 230 may segment the speech transcript 220 from the automatic speech recognition model 210 into the speech segments 240 based on a content of the speech transcript 220. In some embodiments, the sentence segmenter model 230 may use rule-based processes to segment the speech transcript 220. In other embodiments, the sentence segmenter model 230 may use a sentence segmenter machine learning model to segment the speech transcript 220. The sentence segmenter model 230 may segment the speech transcript 220 from the automatic speech recognition model 210 into the speech segments 240 such that the speech segments 240 are smallest possible machine translatable clauses. The smallest possible machine translatable clauses may differ based on the target language. For example, a speech segment 240c may be a smallest possible machine translatable clause for French but not Russian.

Figure 3:
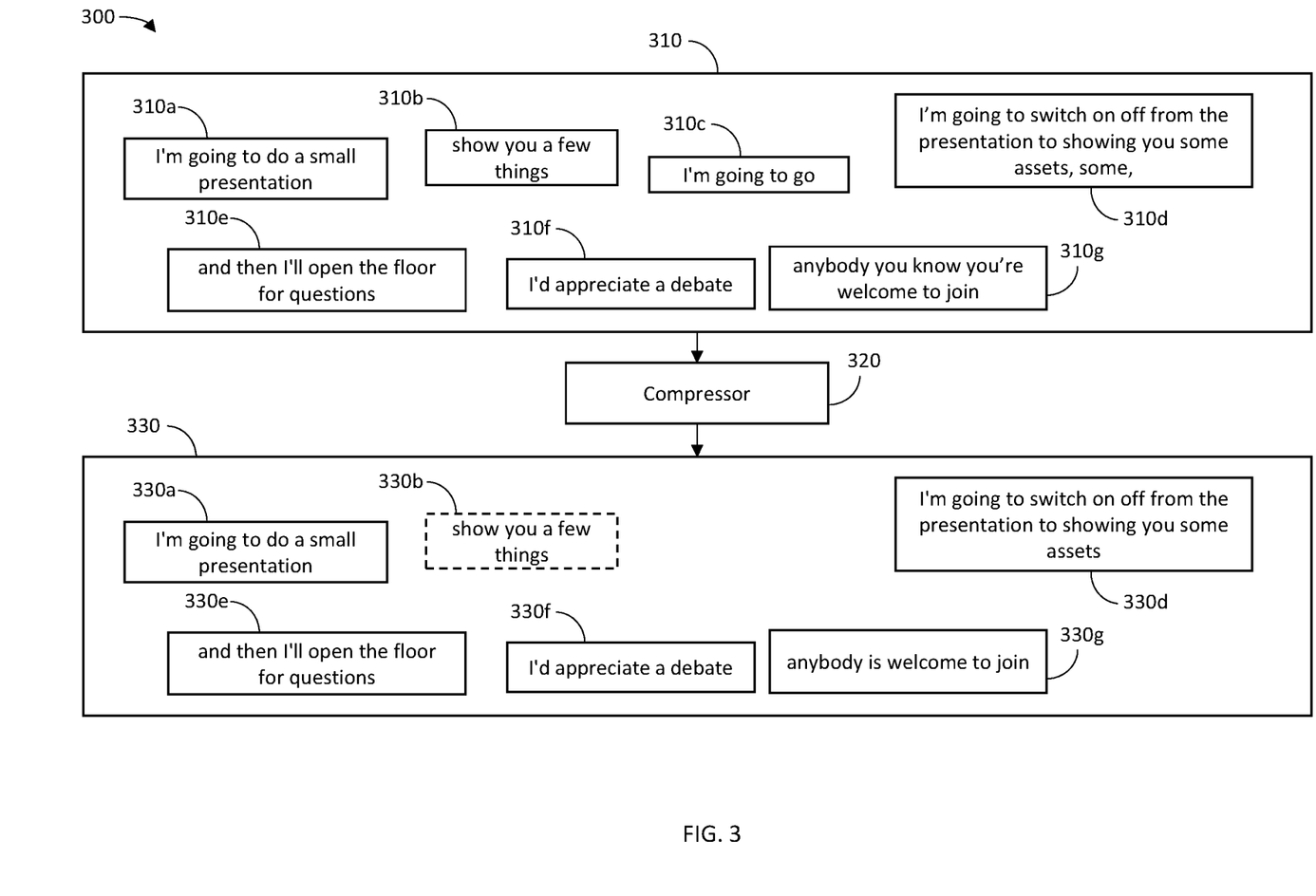
FIG. 3 illustrates a block diagram of compressed speech segments generated from speech segments, according to an embodiment.

FIG. 3 illustrates an example block diagram 300 of speech segments 310 compressed by a sentence compressor model 320 to obtain compressed speech segments 330. The sentence compressor model 320 may be the sentence compressor model 150 of FIG. 1. The sentence compressor model 320 may compress the speech segments 310 based on a content of the speech segments 310. In some embodiments, the sentence compressor model 320 may compress the speech segments 310 using rule-based processes. In other embodiments, the sentence compressor model 320 may compress the speech segments 310 using a sentence compressor machine learning model. The sentence compressor model may eliminate a speech segment 310c based on the speech segment 310c being repetitive of other speech segments of the speech segments 310 causing the compressed speech segments 330 to lack a compressed speech segment 330c. The sentence compressor model 320 may modify a speech segment 310d to obtain a compressed speech segment 330d by removing repetitive words. The sentence compressor model 320 may modify a speech segment 310g to obtain a compressed speech segment 330g by restructuring the speech segment 310g to obtain the simpler compressed speech segment 330g. The sentence compressor model 320 may retain speech segments 310a, 330e, and 330f unaltered as compressed speech segments 330a, 330e, and 330f. The sentence compressor model 320 may eliminate a speech segment 310b or preserve the speech segment 310b as a compressed speech segment 330b based on a compression level of the sentence compressor model 320.

Figure 4:
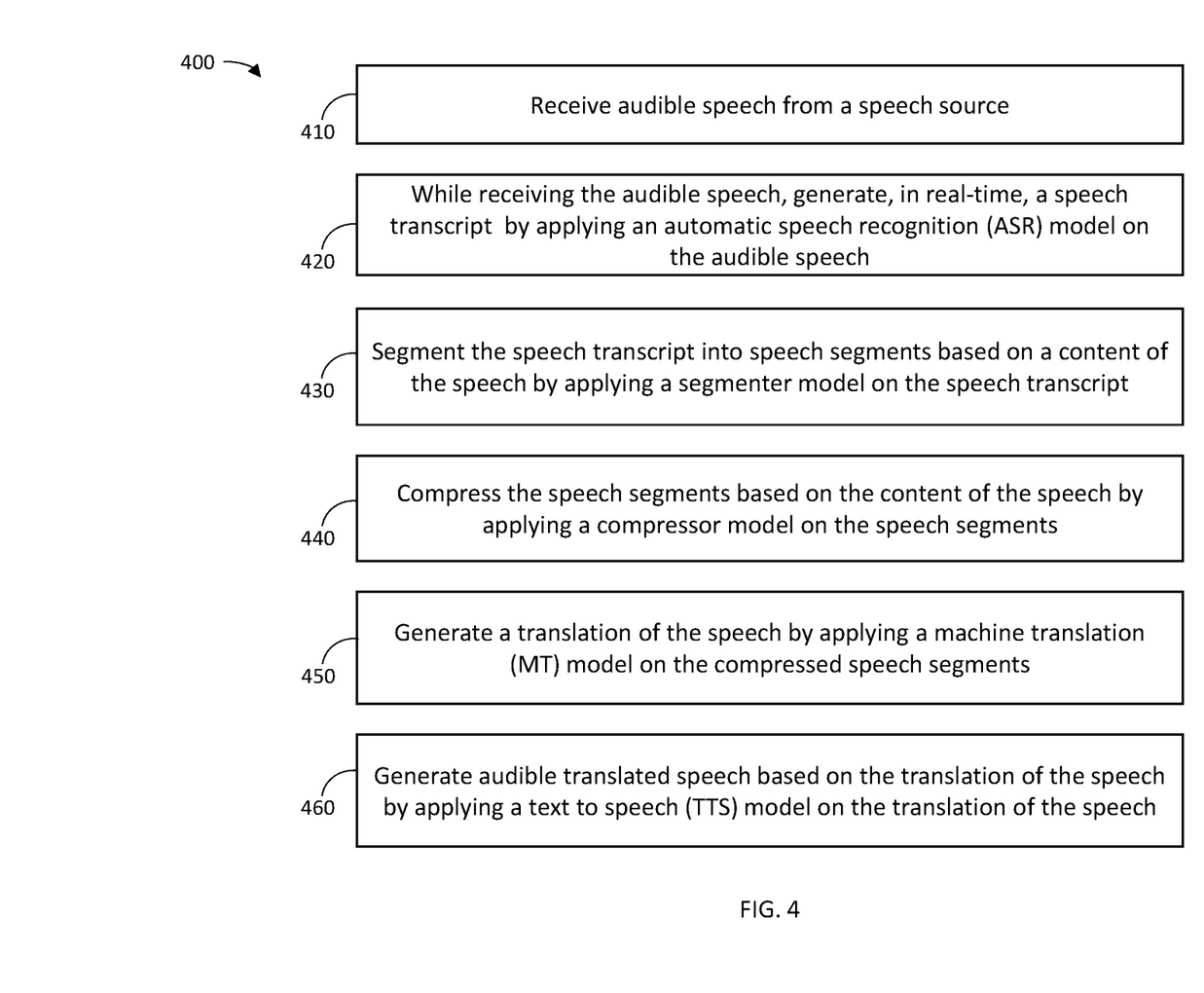
FIG. 4 illustrates a flowchart depicting operational steps for providing automatic interpretation, according to an embodiment.

FIG. 4 illustrates a flowchart 400 depicting operational steps for providing automatic interpretation. Additional, fewer, or alternative steps may be performed. The steps may be performed in the order shown, in a different order, or concurrently. The steps may be performed by the computing system 100 of FIG. 1.

At 410, a processor receives audible speech from a speech source. The audible speech may be in a source language which is to be translated into a target language. In some embodiments, the processor receives the audible speech from an electronic device via a network. For example, the processor may receive an audio stream in the source language over the Internet. In other embodiments, the processor receives the audible speech via a microphone.

At 420, the processor generates, in real-time, a speech transcript by applying an automatic speech recognition model on the audible speech. The speech transcript may be in the source language. The audible speech may serve as input to the automatic speech recognition model. The processor may access, in a non-transitory, processor-readable medium, the automatic speech recognition model and execute the automatic speech recognition model on the audible speech. The automatic speech recognition model may be trained on a corpus of spoken words mapped to written words. The speech transcript may be a text transcription of the audible speech. In some embodiments, the processor may receive one or more known terms. The one or more known terms may be in the audible speech. The processor may provide the one or more terms to the automatic speech recognition model to improve a speech transcript quality.

At 430, the processor segments the speech transcript into speech transcripts based on a content of the speech by applying a segmenter model on the speech transcript as discussed in conjunction with FIG. 2. The speech segments may represent minimal computer-translatable segments of the speech transcript. In some embodiments, segmenting the speech transcript into speech segments includes selecting a number of words to be included in each speech segment. The processor may access the segmenter model in the non-transitory, processor-readable medium and execute the segmenter model on the speech transcript. The segmenter model may be trained on a corpus of sentences mapped to sentence segments. In some embodiments, the segmenter model may be specific to the source language and the target language. The minimal computer-translatable segments of the speech transcripts may depend upon the source language and the target language. For example, the segmenter model may be specific to translating from French to English.

At 440, the processor compresses the speech segments based on the content of the speech by applying a compressor model on the speech segments as discussed in conjunction with FIG. 3. The compressed speech segments may be compressed to simplify the speech segments, remove repetition, remove oralities, and/or shorten the speech segments. The processor may access the compressor model in the non-transitory, processor-readable medium and execute the compressor model on the speech transcript. The compressor model may be trained on a corpus of speech segments mapped to compressed speech segments. The compressor model may include a level of compression. The processor may determine the level of compression based on the speech transcript generated by the automatic speech recognition model. The processor may determine length of the speech transcript. The processor may determine a word/time ratio of the speech segments. The processor may adjust the compression level based on the length of the speech transcript and/or the word/time ratio of the speech segments. For example, the processor may adjust the compression level upwards based on a word/time ratio of the speech segments being high enough to cause a latency above a predetermined threshold between the audible speech and a translation.

At 450, the processor generates a translation of the speech by applying a machine translation model on the compressed speech segments. The processor may access the machine translation model in the non-transitory, processor-readable medium and execute the machine translation model on the speech transcript. The machine translation model may be trained on a corpus of text in the source language mapped to translated text in the target language. Alternately, the processor may translate the speech transcript using a set of rules. Alternately, the processor may translate the speech transcript using available software solutions. In some embodiments, the processor may provide the one or more known terms to the machine translation model to improve a translation quality.

At 460, the processor generates audible translated speech based on the translation of the speech by applying a text to speech model on the translation of the speech. The processor may access the text to speech model in the non-transitory, processor-readable medium and execute the text to speech model on the speech transcript. The text to speech model may be trained on a corpus of text in the target language mapped to audible speech in the target language. Alternately, the processor may synthesize the audible speech using a set of rules. Alternately, the processor may synthesize the audible speech using available software solutions. In some embodiments, the processor may provide the one or more known terms to the text to speech model to improve an audible translated speech quality. In some embodiments, the processor adjusts a speech of the text to speech model. The speed of the text to speech model may be a speech at which the text to speech model generates the audible translated speech based on the translation. A faster speed may be perceived as a faster speaking pace and a slower speed may be perceived as a slower speaking pace. The processor may adjust the speed based on a latency of the audible translated speech relative to the audible speech. In some embodiments, the processor may adjust the speech based on the word/time ratio of the speech segments to reduce the latency of the audible translated speech relative to the audible speech.

In a non-limiting example, the computing system 100 of FIG. 1 is used to provide translation between a Spanish-speaking doctor and a Swedish-speaking patient. The doctor provides known terms such as "fracture," "tibia," and "meniscus" to the computing system 100 to discuss a leg injury with the patient. The doctor speaks in Spanish, explaining the leg injury to the patient. The computing system 100 generates, in real time, a transcription in Spanish of the doctor's explanation using the automatic speech recognition model. The computing system 100 uses the known terms to accurately transcribe the Spanish words for "fracture," "tibia," and "meniscus." The computing system 100 segments the transcription into speech segments using the sentence segmenter model. The speech segments are chunks of the transcription which are machine-translatable from Spanish to Swedish. The computing system 100 compresses the speech segments using the sentence compressor model. As the doctor is speaking, the computing system 100 determines that the doctor's explanation in Spanish is shorter than a Swedish translation and increases a compression level of the sentence compressor model to reduce a latency between the doctor's Spanish speech and an audible Swedish translation. The computing system 100 generates a machine translation of the compressed speech segments and synthesizes audible Swedish speech using the machine translation. The computing system 100 determines that the latency between the doctor's explanation in Spanish and the Swedish translation is above a threshold and increases a speed of the speech synthesis to reduce the latency. Thus, as the doctor is explaining the injury in Spanish, the patient is hearing a low-latency Swedish translation of the explanation. The low latency allows the doctor and patient to communicate without pausing for translation.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A non-transitory, computer-readable medium including instructions which, when executed by at least one processor, cause the at least one processor to:
    apply an automatic speech recognition model to audible speech to generate a speech transcript, the automatic speech recognition model using one or more known terms to generate the speech transcript;

apply a segmenter model on the speech transcript to segment the speech transcript into speech segments based on a content of the speech, each speech segment being a subset of the speech transcript segmented in accordance with the content and a number of words within each segment, wherein the segmenter model is trained to identify the speech segments in accordance with each speech segment's latency value corresponding to a time required to pronounce each segment;

apply a machine translation model on the speech segments to generate a translation of the speech; and apply a text to speech model on the translation of the speech to generate audible translated speech based on the translation of the speech.

2. The medium of claim 1, wherein the instructions further cause the at least one processor to apply a compressor model to compress speech segments based on the content of the speech.

3. The medium of claim 2, wherein the instructions further cause the at least one processor to remove at least one segment or combine at least two segments into a compressed speech segment.

4. The medium of claim 2, wherein the instructions further cause the at least one processor to adjust a compression level of the compressor model.

5. The medium of claim 4, wherein the at least one processor adjusts the compression level based on a length of the speech transcript.

6. The medium of claim 1, wherein the instructions further cause the at least one processor to adjust a speed of the text to speech model.

7. The medium of claim 6, wherein the at least one processor adjusts the speed of the text to speech model based on a latency of the audible translated speech relative to the audible speech.

8. The medium of claim 1, wherein segmenting the speech transcript into speech segments comprises selecting a number of words to be included in each speech segment.

9. A method comprising:
applying, by at least one processor, an automatic speech recognition model to audible speech to generate a speech transcript, the automatic speech recognition model using one or more known terms to generate the speech transcript;

applying, by the at least one processor, a segmenter model on the speech transcript to segment the speech transcript into speech segments based on a content of the speech, each speech segment being a subset of the speech transcript segmented in accordance with the content and a number of words within each segment, wherein the segmenter model is trained to identify the speech segments in accordance with each speech segment's latency value corresponding to a time required to pronounce each segment;

applying, by the at least one processor, a machine translation model on the speech segments to generate a translation of the speech; and applying, by the at least one processor, a text to speech model on the translation of the speech to generate audible translated speech based on the translation of the speech.

10. The method of claim 9, further comprising:
applying, by the at least one processor, a compressor model to compress speech segments based on the content of the speech.

11. The method of claim 10, further comprising:
removing, by the at least one processor, at least one segment or combine at least two segments into a compressed speech segment.

12. The method of claim 10, further comprising:
adjusting, by the at least one processor, a compression level of the compressor model.

13. The method of claim 12, wherein the at least one processor adjusts the compression level based on a length of the speech transcript.

14. The method of claim 9, further comprising:
adjusting, by the at least one processor, a speed of the text to speech model.

15. The method of claim 14, wherein the at least one processor adjusts the speed of the text to speech model based on a latency of the audible translated speech relative to the audible speech.

16. The method of claim 9, wherein segmenting the speech transcript into speech segments comprises selecting a number of words to be included in each speech segment.

17. A system comprising:
a first processor configured to receive audible speech;
a second processor in communication with the first processor, the second processor configured to:
apply an automatic speech recognition model to audible speech received from the first processor to generate a speech transcript, the automatic speech recognition model using one or more known terms to generate the speech transcript;

apply a segmenter model on the speech transcript to segment the speech transcript into speech segments based on a content of the speech, each speech segment being a subset of the speech transcript segmented in accordance with the content and a number of words within each segment, wherein the segmenter model is trained to identify the speech segments in accordance with each speech segment's latency value corresponding to a time required to pronounce each segment;

apply a machine translation model on the speech segments to generate a translation of the speech; and apply a text to speech model on the translation of the speech to generate audible translated speech based on the translation of the speech.

18. The system of claim 17, wherein the second processor is configured to apply a compressor model to compress speech segments based on the content of the speech.

19. The system of claim 18, wherein the second processor is configured to remove at least one segment or combine at least two segments into a compressed speech segment.

20. The system of claim 18, wherein the second processor is configured to adjust a compression level of the compressor model.

* * * * *